United States Patent [19]
Anton et al.

[11] Patent Number: 5,629,372
[45] Date of Patent: May 13, 1997

[54] ACRYLIC FLUOROCARBON POLYMER CONTAINING COATING

[75] Inventors: Douglas R. Anton, Wilmington, Del.; Michael J. Darmon, Aston; William F. Graham, Wayne, both of Pa.; Richard R. Thomas, Wilmington, Del.

[73] Assignee: E. I. Du Pont de Nemours and Company, Wilmington, Del.

[21] Appl. No.: 543,770

[22] Filed: Oct. 16, 1995

Related U.S. Application Data

[63] Continuation-in-part of Ser. No. 345,723, Nov. 22, 1994, abandoned.

[51] Int. Cl.$^6$ .................................................. C08L 27/12
[52] U.S. Cl. .................................. 524/507; 524/544
[58] Field of Search ............................. 524/544, 507

[56] References Cited

U.S. PATENT DOCUMENTS

| | | | |
|---|---|---|---|
| 2,803,615 | 8/1957 | Ahlbrecht et al. | 260/29.6 |
| 3,318,852 | 5/1967 | Dixon | 260/78.5 |
| 3,533,977 | 10/1970 | Read | 260/28.5 |
| 4,366,299 | 12/1982 | Dessaint | 526/243 |
| 4,371,657 | 2/1983 | Chang | 524/512 |
| 4,396,680 | 8/1983 | Chang | 428/421 |
| 4,791,166 | 12/1988 | Saukaitis | 524/544 |
| 4,812,337 | 3/1989 | Sugimura et al. | 427/407.1 |
| 4,859,754 | 8/1989 | Maekawa et al. | 526/245 |
| 5,064,695 | 11/1991 | Hotta et al. | 427/407.1 |
| 5,159,017 | 10/1992 | Miyazono et al. | 525/123 |
| 5,171,877 | 12/1992 | Knaup et al. | 560/26 |
| 5,206,286 | 4/1993 | Swarup et al. | 524/761 |
| 5,250,698 | 10/1993 | Falk et al. | 548/260 |
| 5,356,668 | 10/1994 | Paton et al. | 427/2.25 |

FOREIGN PATENT DOCUMENTS

| | | |
|---|---|---|
| 60-184513 | 9/1985 | Japan. |
| 61-14267 | 1/1986 | Japan. |
| 61-23657 | 2/1986 | Japan. |
| 61-23656 | 2/1986 | Japan. |
| 61-95078 | 5/1986 | Japan. |
| 62-267376 | 11/1987 | Japan. |
| 63-287615 | 12/1991 | Japan. |

*Primary Examiner*—Jeffrey T. Smith
*Attorney, Agent, or Firm*—Hilmar L. Fricke

[57] ABSTRACT

A clear coating composition containing about 45–80% by weight of a binder and 20–55% by weight of an organic liquid; wherein the binder contains (A) about 40–90% by weight, based on the weight of the binder, of an acrylic polymer containing polymerized hydroxyl containing monomers of the following group of hydroxy alkyl acrylate or methacrylates having 1–4 carbon atoms in the alkyl group, and polymerized alkyl acrylates and methacrylates having 1–18 carbon atoms in the alkyl groups, or styrene or any mixtures of the above and 0.1–5.0% by weight, based on the weight of the acrylic polymer, of polymerized fluoroalkyl containing monomer represented by the formula

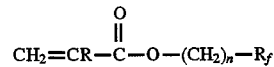

where R is hydrogen or an alkyl group having 1–2 carbon atoms, n is an integer of 1–11 and $R_f$ is a fluoroalkyl containing group having at least 4 carbon atoms and (B) about 10–60% by weight, based on the weight of the binder, of an organic polyisocyanate crosslinking agent; and where a cured layer of the coating composition has a combination of a water advancing contact angle of at least 100° and a hexadecane contact angle of at least 40°.

A process for making the acrylic fluorocarbon polymer and articles coated with the composition also are part of this invention.

7 Claims, No Drawings

ACRYLIC FLUOROCARBON POLYMER CONTAINING COATING

CROSS REFERENCE TO RELATED APPLICATIONS

This application is a continuation in part of Ser. No. 08/345,723 filed Nov. 22, 1994, abandoned.

BACKGROUND OF THE INVENTION

1. Field of the Invention

This invention is directed to acrylic fluorocarbon polymer containing coatings that remain relatively clean under exterior use conditions and are easily cleaned for example by washing with water when soiled.

2. Description of the Prior Art

Acrylic fluorocarbon polymer containing coating compositions that contain relatively small amounts of fluorocarbon having resistance to cratering are shown in Chang U.S. Pat. No. 4,371,657 issued Feb. 1, 1983 and Chang U.S. Pat. No. 4,396,680 issued Aug. 2, 1983. Coating compositions of blends of acrylic polymers and acrylic polymer containing fluorocarbons that form antiicing coatings are well known. Clear coats containing acrylic polymers having small amounts of fluorocarbon constituents that are applied over metallic base coats to provide auto finishes that have good weatherability, have high water and oil repellency and stain resistance are shown in Sugimura et al U.S. Pat. No. 4,812,337 issued Mar. 14, 1989. There is a need for a coating composition that provides for soil resistance, is easily cleaned, has a low content of fluorocarbon constituents which reduces the cost of the composition since fluorocarbon monomers are expensive, and gives a coating that is high in solids that can be applied with conventional equipment and cures to a hard tough durable and weatherable finish without baking at elevated temperatures.

SUMMARY OF THE INVENTION

A clear coating composition containing about 45–80% by weight of a binder and 20–55% by weight of an organic liquid; wherein the binder contains (A) about 40–90% by weight, based on the weight of the binder, of an acrylic polymer containing about 20–45% by weight, based on the weight of the acrylic polymer, of polymerized hydroxyl containing monomers selected from the following group of hydroxy alkyl acrylate or methacrylates having 1–4 carbon atoms in the alkyl group, about 50–79.9% by weight, based on the weight of the acrylic polymer, of polymerized alkyl acrylates and methacrylates having 1–18 carbon atoms in the alkyl groups, or styrene or any mixtures of the above and 0.1–5.0% by weight, based on the weight of the acrylic polymer, of polymerized fluoroalkyl containing monomer represented by the formula

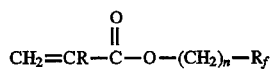

where R is hydrogen or an alkyl group having 1–2 carbon atoms, n is an integer of 1–11 and $R_f$ is a fluoroalkyl containing group having at least 4 carbon atoms and the acrylic polymer has a weight average molecular weight of about 2,000–20,000 determined by gel permeation chromatography and (B) about 10–60% by weight, based on the weight of the binder, of an organic polyisocyanate crosslinking agent; and where a cured layer of the coating composition has a combination of a water advancing contact angle of at least 100° and a hexadecane advancing contact angle of at least 40°.

A process for making the acrylic fluorocarbon polymer and articles coated with the composition also are part of this invention.

DETAILED DESCRIPTION OF THE INVENTION

The coating composition of this invention primarily is used a clear coat over a pigmented base coat containing solid color pigments or metallic flake pigments or mixtures thereof. The coating composition can be applied with conventional spray equipment and cured at ambient temperatures or slightly elevated temperatures which decrease drying time. The resulting clear finish has excellent dirt, water and oil repellency, is easily cleaned by washing with water or a water suffactant mixture or can readily be wiped clean and has good stain resistance and good weatherability.

The coating composition is a clear coating composition, i.e. containing no pigments or a small mount of transparent pigment. The composition has a relatively high solids content of about 45–80% by weight of binder and about 20–55% by weight of an organic carrier which can be a solvent for the binder or a mixture of solvents and non solvent which would form a non aqueous dispersion. The composition has a low VOC (volatile organic content) and meets current pollution regulations.

The coating composition when applied to a substrate and fully cured has a water advancing contact angle of at least 100°, preferably 100°–120° and a hexadecane advancing contact angle of at least 40°, preferably 45°–85° and more preferably 60°–85°.

Contact angles are measured by the Sessile Drop Method which is fully described in A. W. Adamson, *The Physical Chemistry of Surfaces*, 5th Ed., Wiley & Sons, New York, 1990, Chapter II which is hereby incorporated herein by reference.

Briefly, in the Sessile Drop Method, a drop of liquid, either water or solvent, is placed on a surface and the tangent is precisely determined at the point of contact between the drop and the surface. An advancing angle is determined by increasing the size of the drop of liquid and a receding angle is determined by decreasing the size of the drop of liquid. Additional information on the equipment and procedure needed to measure these contact angles are more fully described in R. H. Dettre, R. E. Johnson Jr., *Wettability*, Ed. by J. C. Berg, Marcel Dekker, New York, 1993, Chapter 1 which is incorporated herein by reference.

The relationship between water and organic liquid contact angles and cleanability and dirt retention is described in chapters XII and XIII of A. W. Adamson, above. In general, the higher the contact angle the more dirt or soil resistant the surface is and the easier the surface is to clean.

The acrylic polymer used in the coating composition is prepared by conventional polymerization techniques in which the monomers, except the fluoroalkyl containing monomer, solvent, and polymerization initiator are charged over a 1–24 hour period of time, preferably in a 2–8 hour time period, into a conventional polymerization reactor in which the constituents are heated to about 60°–175° C.; preferably about 140°–170° C. At any a time during the polymerization such as the beginning, end or middle, the polymerizable fluoroalkyl containing monomer usually blended with a solvent can be added at one time period to the reactor. The fluoroalkyl containing monomer is added in about 0.01–10% of the total time of polymerization. Preferably, the fluoroalkyl containing monomer is added after at least some of the other monomers have been added and polymerized at least to some extent. The polymer formed has a weight average molecular weight of about 2,000–20,000, preferably about 5,000–10,000.

Molecular weight is determined by gel permeation chromatography using polystyrene as the standard.

Typical polymerization initiators that are used in the process are azo type initiators such as azo-bis-isobutyronitrile, 1,1'-azo-bis(cyanocyclohexane), peroxy acetates such as t-butyl peracetate, peroxides such as di-t-butyl peroxide, benzoates such as t-butyl perbenzoate, octoates such as t-butyl peroctoate and the like.

Typical solvents that can be used in the process are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, esters, acetates and mixtures of any of the above.

Typical polymerizable monomers that are used to form the acrylic polymer are alkyl (meth)acrylates, meaning alkyl acrylates and alkyl methacrylates, having 1–18 carbon atoms in the alkyl group such as methyl methacrylate, ethyl acrylate, ethyl methacrylate, propyl acrylate, propyl methacrylate, isopropyl methacrylate, butyl acrylate, isobutyl methacrylate, butyl methacrylate, t-butyl methacrylate, pentyl acrylate, pentyl methacrylate, hexyl acrylate, hexyl methacrylate, octyl acrylate, octyl methacrylate, nonyl acrylate, nonyl methacrylate, decyl acrylate, decyl methacrylate, lauryl aerylate, lauryl methacrylate, stearyl acrylate, stearyl methacrylate; other useful monomers are styrene, alpha methyl styrene or any mixtures of these monomers, and hydroxy alkyl (meth)acrylates meaning hydroxy alkyl acrylates and hydroxy alkyl methacrylates having 1–4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like, acrylamide, methacrylamide, acrylonitrile, hydroxy methacrylamide and the like.

The fluoroalkyl containing monomers are used in amounts of about 0.1–5.0% by weight, based on the weight of the acrylic polymer. Useful fluorocarbon monomers are represented by the formula

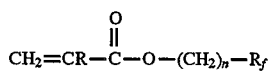

where R is hydrogen or an alkyl group having 1–2 carbon atoms, n is an integer of 1–18 and $R_f$ is a fluoroalkyl containing group having at least 4 carbon atoms and preferably a straight chain or branched chain fluoroalkyl group having 4–20 carbon atoms which optionally can contain an oxygen atom.

Typically useful fluoroalkyl containing monomers are perfluoro methyl ethyl methacrylate, perfluoro ethyl ethyl methacrylate, perfluoro butyl ethyl methacrylate, perfluoro pentyl ethyl methacrylate, perfluoro hexyl ethyl methacrylate, perfluoro octyl ethyl methacrylate, perfluoro decyl ethyl methacrylate, perfluoro lamyl ethyl methacrylate, perfluoro stearyl ethyl methacrylate, perfluoro methyl ethyl acrylate, perfluoro ethyl ethyl acrylate, perfluoro butyl ethyl acrylate, perfluoro pentyl ethyl acrylate, perfluoro hexyl ethyl acrylate, perfluoro octyl ethyl acrylate, perfluoro decyl ethyl acrylate, perfluoro lauryl ethyl acrylate, perfluoro stearyl ethyl acrylate, and the like. Preferred are perfluoro alkyl ethyl methacrylates wherein the perfluoroalkyl group contains 4–20 carbon atoms.

Other useful fluoroalkyl containing monomers are represented by the formula

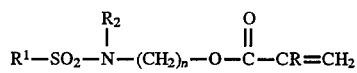

where
R is as defined above,
$R^1$ is a fluoroalkyl group having 4–12 carbon atoms,
$R^2$ is an alkyl group having 1–4 carbon atoms and
n is an integer of 1–4.

Typical of these monomers are the following:

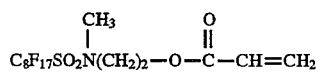

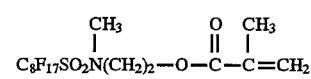

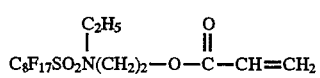

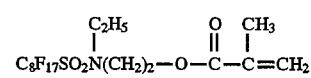

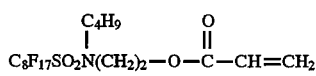

Preferred acrylic polymers which form high quality coatings contain polymerized monomers of an alkyl methacrylate having 2–6 carbon atoms in the alkyl group, an alkyl acrylate having 2–8 carbon atoms in the alkyl group, a hydroxy alkyl acrylate having 2–4 carbon atoms in the alkyl group, styrene and perfluoroalkyl ethyl methacrylate having 4–20 carbon atoms in the alkyl group. One particularly preferred polymer contains butyl methacrylate, butyl acrylate, styrene, hydroxy propyl acrylate and the above perfluoroalkyl containing monomer.

Another preferred acrylic polymer contains polymerized monomers of an alkyl methacrylate having 2–6 carbon atoms in the alkyl group, an alkyl acrylate having 2–8 carbon atoms in the alkyl group, styrene, an alkylene glycol methacrylate and a perfluoro alkyl ethyl methacrylate having 4–20 carbon atoms in the alkyl group. One particularly preferred polymer contains butyl methacrylate, butyl acrylate, hydroxy propyl acrylate, ethylene triglycol methacrylate and the above perfluoro alkyl ethyl methacrylate monomer.

The coating composition contains an organic polyisocyanate crosslinking agent. Any of the conventional aromatic, aliphatic, cycloaliphatic isocyanates, trifunctional isocyanates and isocyanate functional adducts of polyols and diisocyanates can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,5-toluene triisocyanate and the like. Oligomers of diisocyanates also can be used such as the trimer of hexamethylene diisocyanate which is sold under the tradename "Desmodur" N-3390.

Isocyanate functional adducts can be used that are formed from an organic polyisocyanate and a polyol. Any of the aforementioned polyisocyanates can be used with a polyol to form an adduct. Polyols such as trimethylol alkanes like tdmethylol propane or ethane can be used. One useful adduct is the reaction product of tetramethylxylidine diisocyanate and trimethylol propane and is sold under the tradename "Cythane" 3160.

To improve weatherability of the clear coating composition about 0.1–10% by weight based on the weight of the binder, of ultraviolet light stabilizers, screeners, quenchers and antioxidants usually are added. Typical ultraviolet light screeners and stabilizers include the following:

Benzophenones such as hydroxy dodecyl oxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxy phenyl derivatives of triazine, sulfur containing derivatives of dialkyl-4-hydroxy phenyl triazine, hydroxy phenyl-1,3,5-triazine and the like.

Triazines such as 2-phenyl-4-(2,2'-dihydroxybenzoyl)-triazole, substituted benzotriazoles such as hydroxy-phenyltriazole and the like.

Hindered amines such as bis(1,2,2,6,6 pentamethyl-4-piperidinyl sebacate), di[4(2,2,6,6,tetramethyl piperidinyl)] sebacate and the like and any mixtures of any of the above.

The coating composition contains a sufficient mount of a catalyst to cure the composition at ambient temperatures. Generally, about 0.01–2% by weight, based on the weight of the binder, of catalyst is used. Typically useful catalysts are triethylene dime and alkyl tin laurates such as dibutyl tin dilaurate, dibutyl tin diacetate, tertiary amines and the like. Preferred is dibutyl tin dilaurate.

Generally, flow control agents are used in the composition in mounts of about 0.1–5% by weight, based on the weight of the binder, such as polyacrylic acid, polyalkylacrylates, polyether modified dimethyl polysiloxane copolymers and polyester modified polydimethyl siloxane.

When the coating composition is used as a clear coating composition usually over a pigmented base coat, it may be desirable to use pigments in the coating composition which have the same refractive index as the dried coating. Typically useful pigments have a particle size of about 0.015–50 micron and are used in a pigment to binder weight ratio of about 1:100 to 10:100 and are inorganic siliceous pigments such as silica pigment having a refractive index of about 1.4–1.6.

When the coating composition is used as a clear coating on a vehicle such as a car, track, bus, train, or on construction equipment, industrial equipment, structures such as tanks, bridges, exterior or interior of buildings, a basecoating which may be either a solvent based or waterbased composition is first applied and then dried to at least remove solvent or water before the clear coating is applied usually by conventional means such as spraying or electrostatic spraying. The clear coating is dried and cures at ambient temperatures but moderately high temperatures of up to about 90° C. can be used to shorten drying time.

The coating composition with its ease of cleaning and soil resistance is an excellent anti graffiti coating and can be applied as a clear over conventional coatings that are used for the exterior and interior of buildings, subways, buses, trains and for any other structure or vehicle where graffiti is a problem. The composition has good adhesion to a variety of substrates and special treatments or primers are not required.

The following examples illustrate the invention. All parts and percentages are on a weight basis unless otherwise specified. Molecular weight was determined by gel permeation chromatography using polystyrene as the standard.

EXAMPLE 1

An acrylic polymer I solution was prepared in which the acrylic polymer has fluoroalkyl groups by charging the following constituents into a reactor equipped with a heat source, a thermometer and a stirrer:

|  | Parts By Weight |
|---|---|
| Portion 1 | 699.20 |
| Methyl amyl ketone | |
| Portion 2 | |
| Butyl methacrylate monomer (BMA) | 583.80 |
| Styrene monomer (S) | 307.28 |
| Butyl acrylate monomer (BA) | 343.20 |
| Hydroxy propyl acrylate monomer (HPA) | 783.60 |
| Methyl amyl ketone | 4.72 |
| Portion 3 | |
| Fluoro alkyl ethyl methacrylate monomer (FAMA)- (fluoroalkyl group containing C-4 about 4%, C-6 about 30%, C-8 about 30%, C-10 about 20%, C-12 about 10% C-14 and above about 5%) | 30.73 |
| Methyl amyl ketone | 30.00 |
| Portion 4 | |
| T-butyl peroxy acetate | 69.01 |
| Methyl amyl ketone | 114.59 |
| Portion 5 | 33.28 |
| Methyl amyl ketone | |
| Total | 2999.99 |

Portion 1 was charged into the reaction vessel and blanketed with nitrogen and Portion 2 was premixed and added over a 360 minute period while holding the resulting mixture at its reflux temperature of about 150° C. Portion 3 was premixed and then added at one time to the reaction mixture 350 minutes after the start of the addition of Portion 2. Portion 4 was premixed and added at the same time as Portion 2 to the reaction mixture over a 375 minute period and then Portion 5 was added and the reaction mixture was held at its reflux temperature for an additional 60 minutes. The resulting polymer solution was cooled to room temperature.

The resulting acrylic polymer solution I had a weight solids content of about 70%, a polymer of BMA/S/BA/HPA/FAMA in the following percentages 28.5%/15.0%/16.75%/38.25%/1.5% and the polymer had a weight average molecular weight of about 7,000.

A clear acrylic coating composition I was prepared as follows:

|  | Parts by weight |
|---|---|
| Portion 1 | |
| Methyl ethyl ketone | 2.54 |
| Toluene | 2.67 |
| Dibasic acid ester (ester mixture of adipic acid, glutaric acid and succinic acid) | 1.79 |
| Butyl Cellosolve Acetate | 4.96 |
| Portion 2 | 72.79 |
| Acrylic polymer I solution (prepared above) | |
| Portion 3 | |
| Resiflow S (Acrylic polymer flow additive) | 0.35 |
| "Tinuvin" 328 - 2-(2-hydroxy-3,5-ditertiary amyl phenol)-2H-benzotriazole) | 5.58 |
| "Tinuvin" 292 - (1,2,2,6,6-pentamethyl-4-piperidinyl) sebecate | 0.87 |
| Dibutyl tin dilaurate | 0.92 |
| PM acetate | 7.38 |
| Total | 100.00 |

The constituents of Portion 1 were charged into a mixing vessel in the order shown with continuous mixing. Portion 2 was added and mixed for 15 minutes. The constituents of Portion 3 were charged into the mixing vessel in the order shown with constant mixing. The resulting composition had a solids content of about 53.5%. A clear coating composition was prepared by mixing the above composition with a polyisocyanate solution in a 3/1 volume ratio. The polyisocyanate solution contains 90% by weight of the trimer of hexamethylene diisocyanate and 10% by weight solvent of n-butyl acetate/Aromatic 100 solvent in a 1:1 ratio.

Two phosphated cold rolled steel panels that had been coated with a cured electrocoating composition of a polyepoxy hydroxy ether resin crosslinked with a polyisocyanate were spray coated with a white basecoat coating composition of an acrylic polymer containing an organic polyisocyanate crosslinking agent to a dry film thickness of about 18–23 microns. The basecoat was allowed to stand for about 10 minutes to allow solvent to evaporate and then the above prepared clear acrylic coating composition I was spray applied. Two coats were applied with a solvent evaporation time of 2 minutes between the application of each coat. The resulting film was dried at about 83° C. for about 30 minutes. The dry film thickness of the clear coat was about 44–56 microns. The resulting clear coat was smooth and essentially free of craters and had an excellent appearance.

A second set of two panels was prepared. Phosphated cold rolled steel panel electrocoated with the same above described electrocoating composition were coated with a black basecoat coating composition identical to the white basecoat coating composition except black pigmentation was used instead of white pigment and coated with the clear acrylic coating composition I as above and dried and cured as above. The resulting clear coat was smooth and essentially flee of craters and had an excellent appearance. The following properties of the clear coated panel were measured and the results are shown in Table I: 20° Gloss, Distinctness of Image (DOI), Hardness measured in Knoops, Color L, a and b values, advancing and receding water contact angles and advancing and receding hexadecane solvent contact angles.

Acrylic polymer II solution was prepared which is identical to the above acrylic polymer I solution except that fluoroalkyl ethyl methacrylate monomer was not added. The molecular weight of the polymer and the solids of the solution were about the same. A clear acrylic coating composition II was prepared as above using the same polyisocyanate crosslinking agent except that acrylic polymer II solution was used in place of acrylic polymer I solution. Two panels of phosphatized cold rolled steel coated with the same electrocoating composition and with the same white base coat were sprayed with the clear acrylic coating composition II and cured as above. Also, two panels of phosphatized cold rolled steel coated with the same electrocoating composition and with the same black base coat were sprayed with the clear acrylic coating composition II and cured as above. The same properties were measured for both sets of panels as above and the results are shown in Table 1.

TABLE 1

| Clear Coat | Base Coat | 20° gloss | DOI | Knoop | L | a | b | *Cont. angle water | *Cont. angle hex. |
|---|---|---|---|---|---|---|---|---|---|
| I | black | 89 | 88 | 2.2 | 2.08 | −0.11 | −0.20 | 108/68 | 65/49 |
| I | black | 87 | 86 | 4.10 | 2.21 | 0.02 | −0.02 | 108/68 | 65/49 |
| I | white | 84 | 85 | 3.50 | 87.46 | −0.77 | 0.79 | 108/68 | 65/49 |
| I | white | 86 | 87 | 3.30 | 87.59 | −0.76 | 0.87 | 108/65 | 65/49 |
| II | black | 85 | 65 | 2.30 | 2.87 | 0.32 | 0.54 | 76/56 | 2/0 |
| II | black | 87 | 65 | 2.60 | 2.22 | 0.02 | 0.02 | 76/56 | 2/0 |
| II | white | 90 | 82 | 2.20 | 87.52 | −0.87 | 0.27 | 76/56 | 2/0 |
| II | white | 89 | 83 | 2.10 | 87.31 | −0.93 | 0.17 | 76/56 | 2/0 |

*Advancing/Receding contact angles for water and hexadecane

Soil Resistance Test

A soil substitute was prepared by blending 10 g of Nujol (mineral oil), 20g of carbon black, 500 ml of heptane and 1 liter of "Surlyn" polymer beads (polymer of an acrylic ionomer). The resulting suspension was thoroughly mixed and then the heptane solvent was stripped off using a vacuum stripper.

A 2.54 cm length of 7.62 cm OD polyvinyl chloride pipe was place on the surface of the test panel. Three grams of the above prepared soil substitute was poured into the pipe and gently rolled around on the surface of the test panel for a total of fifty rotations. The soil substitute was poured off and the pipe segment was removed. The test panel was then tapped sharply twice on the side of a trash can to remove lightly adhered dirt. The mount of dirt remaining on the panel was measured in delta E traits with a color analyzer. The results of this test are as follows:

Clear coating composition of Acrylic Polymer I containing polymerized fluoroalkyl containing monomers—retained 5.4 delta E units of dirt.

Clear coating composition of Acrylic Polymer II which did not contain fluoroalkyl monomers—retained 35.3 delta E units of dirt.

The data in Table I shows that clear coating compositions made from Acrylic Polymer I containing polymerized fluoroalkyl containing monomers have a higher contact angle for water and for hexadecane which shown in the above Soil Resistance Test provides for a finish which is resistant to soiling and also is easily washed or wiped clean in comparison to the clear coating composition made from Acrylic Polymer II which did not contain the polymerized fluoroalkyl containing monomers which had low contact angles and exhibited poor soil resistance in the Soil Resistance Test and poor cleanability.

EXAMPLE 2

An acrylic polymer solution III was prepared in which the acrylic polymer has fluoro alkly groups by changing the following constituents into a reactor equipped with a heat source, a thermometer and a stirrer:

|  | Parts By Weight |
|---|---|
| Portion 1 |  |
| Methyl amyl ketone | 699.92 |
| Portion 2 |  |
| Butyl methacrylate monomer (BMA) | 583.80 |
| Styrene monomer (S) | 307.28 |
| Butyl acrylate monomer (BA) | 343.20 |
| Hydroxy propyl acrylate monomer (HPA) | 783.46 |
| Methyl amyl ketone | 4.72 |
| Portion 3 |  |
| Fluoromethacrylate monomer [2-(N-ethyl perfluorooctane sulfonamido) ethyl methacrylate monomer] | 30.73 |
| Methyl amyl ketone | 30.00 |

-continued

|  | Parts By Weight |
|---|---|
| Portion 4 |  |
| T-butyl peroxy acetate | 69.01 |
| Methyl amyl ketone | 114.59 |
| Portion 5 |  |
| Methyl amyl ketone | 33.28 |
| Total | 2999.99 |

Portion 1 was charged into the reaction vessel and blanketed with nitrogen and Portion 2 was premixed and added over a 360 minutes period while holding the resulting mixture at its reflux temperature of about 150° C. Portion 3 was premixed and then added at one time to the reaction mixture 350 minutes after the start of the addition of Portion 2. Portion 4 was premixed and added at the same time as Portion 2 to the reaction mixture over a 375 minute period and then Portion 5 was added and the reaction mixture held at its reflux temperature for an additional 60 minutes. The resulting polymer solution was cooled to room temperature.

The resulting acrylic polymer solution III had a weight solids content of about 70%, a polymer of BMA/S/BA/HPA/Fluoromethacrylate in the following percentages 28.5/15/17/38/1.5 and the polymer had a weight average molecular weight of about 6400 and a number average molecular weight of about 3200.

A dear acrylic coating composition III was prepare as in Example 1 using the same polyisocyanate crosslinking agent in the same ratio except the above prepared acrylic polymer solution III was used in the place of acrylic polymer solution I. Two panels of phosphatized cold rolled steel coated with the same electrocoating composition and with the same white base coat as in Example 1 were sprayed with the clear acrylic coating composition III and cured as above. Also, two panels of phosphatized cold rolled steel coated with the same electrocoating composition and with the same black base coat as in Example 1 were sprayed with the clear coating acrylic composition III and cured as above. The resulting cured coating had a smooth glossy finish which was essentially free of craters. The same properties were measured for both sets of panels as above and the results are shown in Table 2 below.

TABLE 2

| Clear Coat | Base Coat | 20° gloss | DOI | knoop | L | a | b | *Cont. angle water | *Cont. angle hex. |
|---|---|---|---|---|---|---|---|---|---|
| III | black | 85 | 56 | 2.3 | 2.27 | −0.14 | −0.15 | 101/61 | 60/44 |
| III | white | 89 | 86 | 1.9 | 87.57 | −0.90 | 0.30 | 107/65 | 61/42 |

*Advancing/Receding contact angles for water and hexadecane.

The above data shows that the clear coating composition made from acrylic polymer solution III containing polymerized fluoroalkyl containing monomers had a high contact angle for water and for solvents which provides for a finish which is resistant to soiling and is easily washed or wiped clean.

EXAMPLE 3

This is a comparative Example in which the following clear acrylic coating compositions IV–VII were formulated by blending a non fluorinated acrylic polymer with an a highly fluorinated acrylic polymer in an attempt to achieve the same results as in Examples 1 and 2 where an acrylic polymer was used having a small percentage of polymerized fluoro alkyl ethyl methacrylate monomer.

An acrylic polymer solution IV was prepared in which the acrylic polymer has perfluoro alkly groups by charging the following constituents into a reactor equipped with a heat source, a thermometer and a stirrer:

|  | Parts By Weight |
|---|---|
| Portion 1 |  |
| Methyl amyl ketone | 232.92 |
| Portion 2 |  |
| Hydroxy propyl acrylate monomer (HPA) | 260.72 |
| Fluoro alkly ethyl methacrylate monomer (FAMA) described in Example 1 | 422.64 |
| Methyl amyl ketone | 1.57 |
| Portion 3 |  |
| T-butyl peroxy acetate | 22.97 |
| Methyl amyl ketone | 38.14 |
| Portion 4 | 21.06 |
| Methyl amyl ketone |  |
| Total | 1000.02 |

Portion 1 was charged into the reaction vessel and blanketed with nitrogen and Portion 2 was premixed and added over a 240 minutes period while holding the resulting mixture at its reflux temperature of about 150° C. Portion 3 was premixed and then added at the same time as Portion 2 over a 255 minute period of time. Portion 4 was added and the resulting polymer solution was cooled to room temperature.

The resulting acrylic polymer solution IV had a weight solids content of about 70%, a polymer of HPA/FAMA in the following percentages 38/72 and the polymer had a weight average molecular weight of about 7,600 and a number average molecular weight of about 5,300.

A clear acrylic coating composition IV was prepared with the above prepared acrylic polymer solution IV as follows:

|  | Parts By Weight |
|---|---|
| Portion 1 |  |
| Methyl ethyl ketone | 25.40 |
| Toluene | 26.70 |
| Dibasic acid ester (ester mixture of adipic acid, glutaric acid and succinic acid) | 17.90 |
| Butyl Cellosolve Acetate | 49.60 |
| Portion 2 | 2.00 |
| Acrylic polymer solution IV (prepared above) |  |
| Portion 3 |  |
| Acrylic polymer solution (70% solids of an acrylic polymer of BMA/BA/S/HPA in a weight ratio of 30/17/15/38 in methyl amyl ketone) | 730.90 |
| "Tinuvin" 328 - 2-(2-hydroxy-3,5-ditertiary amyl phenol)-2H-benzotriazole) | 55.80 |
| "Tinuvin" 292 - (1,2,2,6,6-pentamethyl-4-piperidinyl) sebecate | 8.70 |
| Dibutyl tin dilaurate | 9.20 |
| PM acetate | 73.80 |
| Total | 1000.00 |

The constituents of Portion 1 were charged into a mixing vessel in the order shown with continuous mixing. Portion 2 was added and mixed for 15 minutes. The constituents of portion 3 were charged into the mixing vessel in the order shown with constant mixing. The resulting composition had a solids content of about 53.5%. A clear coating composition was prepared by mixing the above composition with a polyisocyanate solution in a 3/1 volume ratio. The polyisocyanate solution contains 90% by weight of the trimer of hexamethylene diisocyanate and 10% by weight solvent of n-butyl acetate/Aromatic 100 solvent in a 1:1 ratio.

Clear acrylic coating compositions V, VI and VII were prepared using the same constituents as above except the fluorinated acrylic polymer content was increased to 5.00 parts by weight in composition V, to 10.00 parts by weight in composition VI and to 20.00 parts by weight in composition VII with an equivalent reduction in the amount of acrylic polymer IV in each composition.

Four panels of phosphatized cold rolled steel coated with the same electrocoating composition and with the same black base coat as described in Example 1 were each sprayed respectively with one of the above prepared clear acrylic coating composition IV–VII and cured as in Example 1. Each of the panels had a finish with an unacceptable number of craters and the appearance was unacceptable. The properties of each of the panel was measured as in Example 1 and are shown in the table below.

TABLE 3

| Clear Coat | Base Coat | 20° gloss | DOI | knoop | L | a | b | *Cont. angle water | *Cont. angle hex. |
|---|---|---|---|---|---|---|---|---|---|
| IV | black | 76 | 42 | 6.5 | 2.29 | −0.06 | −0.26 | 108/60 | 67/63 |
| V | black | 73 | 31 | 6.4 | 3.69 | 0.14 | 0.14 | 109/60 | 68/64 |
| VI | black | 88 | 84 | 6.8 | 2.25 | −0.09 | −0.09 | 109/60 | 70/64 |
| VII | black | 87 | 73 | 6.0 | 2.43 | −0.06 | −0.28 | 110/63 | 71/65 |

*Advancing/Receding contact angles for water and hexadecane

The water and solvent contact angles indicate that the clear acrylic coating compositions IV–VII would have good soil resistance and good cleanability; however, the appearance of each of the compositions due to cratering of the coating make the compositions unacceptable for commercial use.

We claim:

1. A clear coating compositions containing about 45–80% by weight of a binder and 20–55% by weight of an organic liquid; wherein the binder comprises (A) about 40–90% by weight, based on the weight of the binder, of an acrylic polymer consisting essentially of about 20–45% by weight, based on the weight of the acrylic polymer, of polymerized hydroxyl containing monomers selected from the group consisting of hydroxy alkyl acrylate and hydroxy alkyl methacrylates having 1–4 carbon atoms in the alkyl groups, 50–79.9% by weight, based on the weight of the acrylic polymer, of polymerized monomers selected from the group consisting of alkyl acrylates and alkyl methacrylates having 1–18 carbon atoms in the alkyl groups, styrene or any mixtures of the above and 0.1–5.0% by weight, based on the weight of the acrylic polymer, of polymerized fluoroalkyl containing monomer represented by the formula

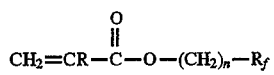

where R is selected from the group consisting of hydrogen or an alkyl group having 1–2 carbon atoms, n is an integer of 1–11 and $R_f$ is a fluoroalkyl containing group having at least 4 carbon atoms and the acrylic polymer having a weight average molecular weight of about 2,000–20,000 determined by gel permeation chromatography;

wherein the acrylic polymer is formed by polymerizing said monomers and the fluoroalkyl containing monomer is added in the entire amount at any time during the polymerization in about 0.01–10% of the total time of polymerization;

(B) about 10–60% by weight, based on the weight of the binder, of an organic polyisocyanate crosslinking agent; and where a cured layer of the coating of the composition has a combination of advancing water contact angle of at least 100° and a hexadecane advancing contact angle of at least 40°.

2. The coating composition of claim 1 in which $R_f$ is a straight chain or branched chain fluoroalkyl group having 4–20 carbon atoms.

3. The coating composition of claim 2 in which the acrylic polymer consists essentially of polymerized monomers of an alkyl methacrylate having 2–6 carbon atoms in the alkyl group, an alkyl acrylate having 2–8 carbon atoms in the alkyl group, a hydroxy alkyl acrylate having 2–4 carbon atoms in the alkyl group, styrene and a fluoroalkyl containing monomer wherein R is $CH_3$, n is 2 and $R_f$ is a fluoroalkyl group having 4–20 carbon atoms and the polyisocyanate is an aliphatic or cycloaliphatic polyisocyanate and the cured layer of the composition has an advancing water contact angle of 100°–120° and a hexadecane advancing contact angle of 45°–85° C.

4. The coating composition of claim 3 in which the acrylic polymer consists essentially of butyl methacrylate, butyl acrylate, styrene, hydroxy propyl acrylate and the fluoroalkyl containing monomer.

5. The coating composition of claim 1 in which the fluoroalkyl containing monomer is represented by the formula

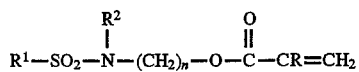

where

R is as defined in claim 1, $R^1$ is a fluoroalkyl group having 4–12 carbon atoms, $R^2$ is an alkyl group having 1–4 carbon atoms and n is an integer of 1–4.

6. The coating composition of claim 1 containing about 0.1–10% by weight, based on the weight of the binder, of ultraviolet light stabilizer or an antioxidant or mixtures thereof.

7. A substrate coated with a dried and cured layer of the composition of claim 1.

* * * * *